United States Patent
Weill et al.

(10) Patent No.: US 9,521,060 B2
(45) Date of Patent: Dec. 13, 2016

(54) IDENTIFYING SERVICES PROVIDED OVER SECURED CONNECTIONS USING DNS CACHING

(71) Applicant: Vasona Networks Inc., Santa Clara, CA (US)

(72) Inventors: Ofer Weill, Modin (IL); Roni Bar-Yanai, Even-Yehuda (IL); Ishai Asa, Tel Aviv (IL)

(73) Assignee: VASONA NETWORKS INC., San Jose, CA (US)

( * ) Notice: Subject to any disclaimer, the term of this patent is extended or adjusted under 35 U.S.C. 154(b) by 236 days.

(21) Appl. No.: 14/341,809

(22) Filed: Jul. 27, 2014

(65) Prior Publication Data

US 2016/0028607 A1    Jan. 28, 2016

(51) Int. Cl.
| | | |
|---|---|---|
| *G06F 15/173* | (2006.01) | |
| *H04L 12/26* | (2006.01) | |
| *H04L 29/12* | (2006.01) | |
| *H04L 29/08* | (2006.01) | |
| *H04L 12/851* | (2013.01) | |
| *H04L 12/24* | (2006.01) | |
| *H04L 29/06* | (2006.01) | |

(52) U.S. Cl.
CPC ........... *H04L 43/12* (2013.01); *H04L 41/5019* (2013.01); *H04L 43/062* (2013.01); *H04L 47/2441* (2013.01); *H04L 47/2483* (2013.01); *H04L 61/1511* (2013.01); *H04L 61/2503* (2013.01); *H04L 63/0428* (2013.01); *H04L 67/2842* (2013.01); *H04L 47/24* (2013.01)

(58) Field of Classification Search
CPC ....... H04L 43/00–43/04; H04L 47/10–47/127; H04L 63/0227–63/0263; H04L 41/5003–41/5035; H04L 47/24–47/2483; H04L 61/1511
See application file for complete search history.

(56) References Cited

U.S. PATENT DOCUMENTS

| | | | |
|---|---|---|---|
| 7,769,875 B1 | 8/2010 | Moisand et al. | |
| 9,071,984 B1* | 6/2015 | Vivanco | H04W 28/0231 |
| 2012/0101952 A1* | 4/2012 | Raleigh | G06Q 30/016 |
| | | | 705/304 |
| 2013/0132854 A1* | 5/2013 | Raleigh | G06F 3/0482 |
| | | | 715/738 |

(Continued)

OTHER PUBLICATIONS

"Cache". Newton's Telecom Dictionary 26th ed. 2011.*

(Continued)

*Primary Examiner* — Brendan Higa
(74) *Attorney, Agent, or Firm* — D. Kligler IP Services Ltd.

(57) ABSTRACT

A method for communication includes intercepting Domain Name System (DNS) messages that are sent in a communication network in preparation for setting up respective communication sessions that provide respective services associated with respective service types. DNS information that is indicative of the respective service types is extracted from the intercepted DNS messages, and the extracted DNS information is cached. A service type associated with a given communication session is identified using the cached DNS information, and a traffic policy is applied to the given communication session depending on the identified service type.

19 Claims, 4 Drawing Sheets

(56) References Cited

U.S. PATENT DOCUMENTS

| | | | | |
|---|---|---|---|---|
| 2013/0312054 | A1* | 11/2013 | Wang | H04L 63/0236 726/1 |
| 2013/0326631 | A1 | 12/2013 | Cartmell et al. | |
| 2013/0332986 | A1* | 12/2013 | Sima | H04L 63/20 726/1 |
| 2015/0120909 | A1* | 4/2015 | Karthikeyan | H04L 61/1511 709/224 |

OTHER PUBLICATIONS

Rescorla, E., "HTTP OVER TLS", Network Working Group, RFC 2818, 7 pages, May 2000.

Dierks et al., "The Transport Layer Security (TLS) Protocol," Network Working Group, RFC 5246, version 1.2, 104 pages, Aug. 2008.

3GPP TS 25.401., "3rd Generation Partnership Project; Technical Specification Group Radio Access Network; UTRAN overall description", Release 12, version 12.0.0, 63 pages, Dec. 2013.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2", Release 11, version 11.7.0, 209 pages, Sep. 2013.

Blake-Wilson et al., "Transport Layer Security (TLS) Extensions", Network Working Group, RFC 3546, 26 pages, Jun. 2003.

"Capture DNS queries with DNSQuery Sniffer-Hacker 10-Security Hacker", 3 pages, Jun. 19, 2013 URL: http://www.hacker10.com/other-computing/capture-dns-queries-with-dnsquery-sniffeer/.

Cisco Systems Inc., "User Guide for ASA CX and Cisco Prime Security Manager 9.1", 370 pages, Jan. 1, 2013.

"Project 2: Sniffing UDP and TCP Traffic with Wireshark (15 pts.)", 3 pages, Aug. 21, 2013 URL: https://samsclass.info1106/proj13/p2_WireShark_UDP_TCP.htm.

European Application # 15172891.2 Search Report dated Jan. 4, 2016.

* cited by examiner

IDENTIFYING SERVICES PROVIDED OVER SECURED CONNECTIONS USING DNS CACHING

FIELD OF THE INVENTION

The present invention relates generally to communication systems, and particularly to methods and systems for identifying services provided over secured connections.

BACKGROUND OF THE INVENTION

Various communication networks enable network users to consume certain services over the network. Such services include, for example, web browsing, file download, and the delivery of multimedia content.

Some network services may be provided over secured connections. Network traffic delivered over secured connections is typically ciphered so that only the parties who set up the secured connection can decipher the traffic content.

Protocols for secured communication are known in the art. For example, the Hypertext Transfer Protocol Secure (HTTPS) is a communications protocol for secure communication that has an underlying security layer, namely the Transport Layer Security (TLS) layer protocol. HTTPS is specified, for example, in RFC 2818 of the Internet Engineering Task Force (IETF), entitled "HTTP OVER TLS," May 2000, which is incorporated herein by reference. TLS is described, for example, in RFC 5246, entitled "The Transport Layer Security (TLS) Protocol," version 1.2, August 2008, which is incorporated herein by reference.

SUMMARY OF THE INVENTION

An embodiment of the present invention provides a method for communication, including intercepting Domain Name System (DNS) messages that are sent in a communication network in preparation for setting up respective communication sessions that provide respective services associated with respective service types. DNS information that is indicative of the respective service types is extracted from the intercepted DNS messages, and the extracted DNS information is cached. A service type associated with a given communication session is identified using the cached DNS information, and a traffic policy is applied to the given communication session depending on the identified service type.

In some embodiments, the given communication session delivers a respective service over a secured connection. In other embodiments, extracting the DNS information includes extracting from the DNS messages Uniform Resource Identifiers (URIs) identifying hosts in the communication network to which users attempt to connect, and respective IP addresses of the hosts, and mapping the extracted URIs to one or more predefined service types, and caching the DNS information includes caching the extracted IP addresses and the one or more service types in association with one another. In yet other embodiments, identifying the service type includes intercepting in traffic of the given communication session a host IP address of a host associated with the given communication session, retrieving a cached host URI that is associated with the host IP address, and mapping the host URI to respective one or more predefined service types.

In an embodiment, the communication sessions are associated with respective users consuming the respective services, and with respective geographical areas over which the communication sessions are delivered, and caching the DNS information includes caching the IP address and identified service type locally per user and globally per geographical area, and identifying the service type includes retrieving the globally cached service type only if retrieving the locally cached service type fails. In another embodiment, applying the traffic policy includes applying the traffic policy separately per user. In yet other embodiments, applying the traffic policy includes applying the traffic policy separately per the geographical area.

In some embodiments, identifying the service type includes intercepting a session initiation request message that a user sends to a host to establish the given communication session, and if the initiation request message includes a Session Name Indication (SNI), mapping the SNI to a respective predefined service type. In other embodiments, identifying the service type includes intercepting a certificate that a host sends to a user in setting up the given communication session, and mapping service-type related information embedded in the certificate to one or more predefined service types. In yet other embodiments, identifying the service type includes monitoring flow characteristics of the given communication session, and identifying the service type based on the flow characteristics.

In an embodiment, applying the traffic policy includes changing a rate of data delivery of traffic of the given communication session. In another embodiment, applying the traffic policy includes applying the traffic policy based on congestion conditions that evolve in the communication network.

There is additionally provided, in accordance with an embodiment of the present invention, apparatus including a cache memory and a processor. The processor is configured to intercept Domain Name System (DNS) messages that are sent in a communication network in preparation for setting up respective communication sessions that provide respective services associated with respective service types, to extract from the intercepted DNS messages DNS information that is indicative of the respective service types, to cache the extracted DNS information, to identify a service type associated with a given communication session using the cached DNS information, and to apply a traffic policy to the given communication session depending on the identified service type.

The present invention will be more fully understood from the following detailed description of the embodiments thereof, taken together with the drawings in which:

DETAILED DESCRIPTION OF EMBODIMENTS

Overview

Figure 1:
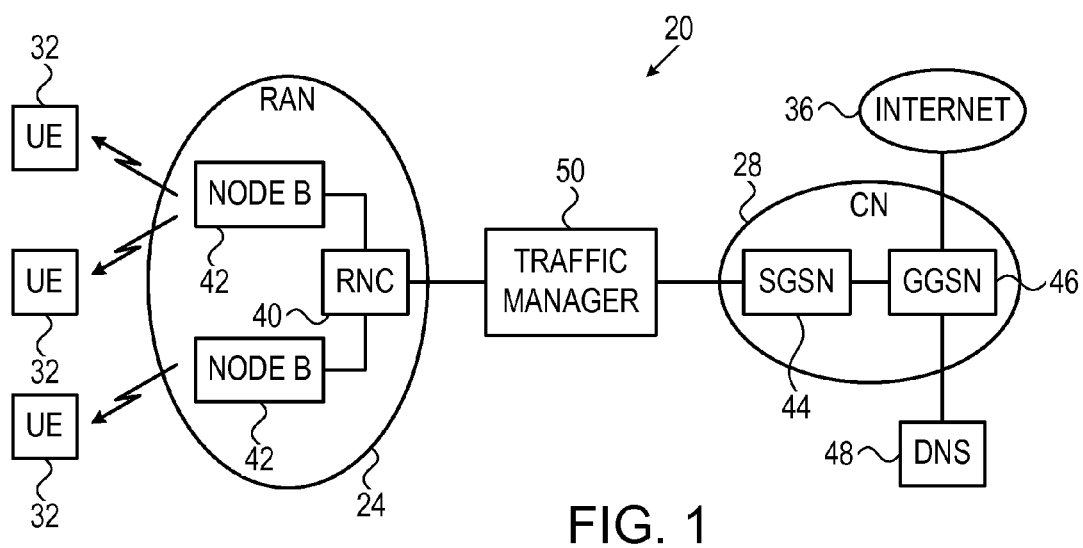
FIG. 1 is a block diagram that schematically illustrates a communication system, in accordance with an embodiment of the present invention.

In various communication systems, network users may consume certain services over the network. A server that provides a service to network users is also referred to herein as a serving host, or simply host for brevity. The user typically executes a suitable program or application (e.g., a web browser) that manages the communication with the serving host and enables the user to consume the provided service. The flow of traffic messages communicated between the user and the serving host is referred to herein as a communication session.

Network services may be of various service types, such as web browsing, video delivery and file transfer. Some of the traffic messages in a communication session may include information indicative of the type of service the session provides. When communicating securely, however, the session traffic is typically encrypted. Therefore, any information in the traffic content that may be related to the type of the service provided is unavailable to network elements other than the user and the serving host who set up the session.

Embodiments of the present invention that are described herein provide improved methods and systems for identifying the type of service that a user consumes over a secured connection. The identified service type can be used, for example, for selective, service-type-dependent control of the traffic delivered in individual communication sessions. For example, when the demand for network services approaches or exceeds the network capacity, the traffic may be controlled so that services that are real-time in nature are delivered with higher priority than other services. For example, web-browsing sessions may be given priority over file-download sessions.

When initiating communication with a serving host, the user typically performs handshake and negotiation processes, including a Domain Name System (DNS) resolution phase, in which the user exchanges DNS information with a DNS server. The user typically sends a DNS request message that includes a domain name identifying the serving host to a DNS server, which responses by returning the respective IP address of the serving host. The domain name (or hostname) of the host, may comprise, for example, a Uniform Resource Identifier (URI) or a Uniform Resource Locator (URL).

The user then uses the IP address of the host to establish a communication session with the serving host. For example, in some embodiments, the communication session comprises a HTTPS communication session, and the user and serving host exchange session establishment messages in accordance with the HTTPS specification cited above.

In the disclosed embodiments, a traffic manager is installed in a wireless communication network, for example between the Radio Access Network (RAN) and the Core Network (CN). The traffic manager intercepts DNS messages that are sent in preparation for setting up secured communication sessions. The traffic manager extracts from the intercepted DNS messages DNS information that is indicative of respective service types of the sessions to be established and identifies one or more service types that are related to the DNS information. The traffic manager caches the extracted DNS information with the identified service type(s) in a DNS cache memory. The cached service types are also referred to herein as IP-based service types.

The traffic manager may cache the DNS information (e.g., IP address of the serving host) and respective service types per user (i.e., per user equipment—UE), more generally per geographical area, or both locally per user and globally per geographical area.

In some embodiments, the traffic manager identifies the service type(s) associated with a given communication session using several sources of information embedded in the session traffic (i.e., in addition to or instead of the cached service types) and applies a traffic policy to control the traffic of the given communication session depending on the identified service type(s) (possibly in combination with additional criteria). As the session advances, the traffic manager may intercept additional service-type related information, which becomes available for identifying the service types dynamically and more accurately.

The traffic manager may identify the service type associated with a given communication session in various ways. In an embodiment, the traffic manager identifies the service type(s) by mapping the URI extracted for a DNS response message to respective one or more predefined service types.

In another embodiment, the traffic manager intercepts in traffic of the given communication session a host IP address of the host, and recovers from the DNS cache the IP-based service type(s) that are associated with the IP address of the host. In an embodiment, although not necessarily, the traffic manager uses this feature when the DNS response message is missing, for example, because the user has the DNS information cached locally and does not generate a DNS request message.

As can be appreciated, the above techniques assume that the traffic manager is able to intercept the DNS messages that precede the session. Moreover, the URI and IP address assigned to the session may not always be indicative of a single service type. In some embodiments, the traffic manager addresses these issues by employing various complementary techniques.

For example, in some embodiments the traffic manager identifies the service type by intercepting a session initiation request message that the user sends to the host to establish a secured communication session, and if the session initiation request message includes a Session Name Indication (SNI), the traffic manager maps the SNI to a respective predefined service type, also referred to herein as a SNI-based service type.

In other embodiments, the traffic manager intercepts a session initiation response message that the host sends to the user in response to receiving the session initiation request message. The initiation response message typically comprises a certificate that is indicative of one or more service types. The traffic manager maps service-type related information that is embedded in the certificate to one or more predefined service types, which are also referred to herein as certificate-based service type(s).

In yet other embodiments, the traffic manager monitors certain flow characteristics of the session to determine flow-based service types. For example, the traffic manager monitors the data volume delivered over a given communication session since session initiation, and distinguishes between a download service type and a browsing service type based on the data volume. Other example for flow control characteristics and related service types are given further below.

In some embodiments, a decision unit accepts service types that were identified using the various information sources. The information sources include IP-based, SNI-based, certificate-based and flow-based service type(s) as described above. The decision unit combines the service types of the various sources using any suitable method, and outputs one or more updated service types. The traffic manager then stores the updated service types in a respective session state.

When intercepting traffic of a session whose state includes one or more service type(s), the traffic manager applies traffic control policy to the session based on the service type(s), and possibly on other dynamic information.

The traffic manager may apply any suitable traffic policy based on the identified service types(s). In an example embodiment, the traffic manager controls the rate of data delivery of the given communication session traffic. For example, the traffic manager may give higher delivery priority to sessions that deliver multimedia content than to other sessions. Alternatively or additionally, the traffic manager may apply the traffic policy based on dynamic information such as, for example, congestion conditions that evolve in the communication network.

In the disclosed techniques, a traffic manager infers the service type(s) from information carried in messages that the user and service host exchange in preparation for setting up a secured communication session. The traffic manager caches the identified service type in a cache memory, and uses the cached information to identify the service type of subsequent communication sessions. Additionally, the traffic manager stores the identified service types in a session state and updates the service type(s) based on other information that is intercepted in the session traffic and mapped to respective service types. The traffic manager uses the service type(s) stored in the session state to control the session traffic on the fly.

System Description

FIG. 1 is a block diagram that schematically illustrates a communication system 20, in accordance with an embodiment of the present invention. System 20 may comprise any suitable communication network, such as, for example, a wireless network, a terrestrial network, or a combination of wireless and terrestrial networks. Additionally, system 20 may deliver traffic across the network, using any suitable interfaces and related protocols, and at any suitable data rates.

In the present example, communication system 20 comprises a mobile communication network, in which a Radio Access Network (RAN) 24, together with a Core Network (CN) 28, enable multiple mobile terminals 32 to access various services over the network. The services may originate in, or delivered via a land part of the network, such as, for example, a local or a wide area network (WAN/LAN), or Internet network 36.

In the example of FIG. 1, communication system 20 comprises a 3GPP Universal Mobile Telecommunications System (UMTS). In UMTS, RAN 24 is part of an Access Network (AN), which is also referred to as Universal Terrestrial Radio Access Network (UTRAN). UTRAN is described, for example, in 3GPP Technical Specification TS 25.401, entitled "3rd Generation Partnership Project; Technical Specification Group Radio Access Network; UTRAN overall description," (3GPP TS 25.401, version 12.0.0, Release 12), December 2013, which is incorporated herein by reference.

RAN 24 comprises a Radio Network Controller (RNC) 40, which provides control functionalities to one or more Base Stations (BSs) 42, also referred to as Node Bs. The functionalities of RNC 40 and Node B 42 can be implemented on the same device, or can be implemented on physically separated devices.

Alternatively, communication system 20 may comprise a Long Term Evolution (LTE) network, in which RAN 24 comprises an Evolved Universal Terrestrial Radio Access Network (E-UTRAN), in which BSs 42 comprise an eNodeB device that typically includes the control functionalities of RNC 40. E-UTRA is described, for example, in 3GPP Technical Specification TS 36.300, entitled "Group Radio Access Network; Evolved Universal Terrestrial Radio Access (E-UTRA) and Evolved Universal Terrestrial Radio Access Network (E-UTRAN); Overall description," (3GPP TS 36.300, version 11.7.0, Release 11), September, 2013, which is incorporated herein by reference.

Mobile terminal 32, which is also referred to in UMTS and LTE networks as a User Equipment (UE), may comprise any wireless device, such as, for example, a hand-held telephone, a laptop computer equipped with a mobile broadband adapter, a wireless-enabled mobile computing device, or any other suitable type of wireless communication terminal.

Network data services are sometimes provided using a General packet radio service (GPRS) protocol. GPRS is a 2.5G and 3G mobile communications technology that enables mobile network operators to offer their mobile subscribers packet-based data services, such as access to the Internet, over GSM (and other) networks. A GPRS core network provides, among other tasks, mobility management, session management and transport for Internet Protocol (IP) packet services in various networks, such as, for example, GSM and WCDMA networks. In the example of communication system 20, CN 28 comprises a GPRS/UMTS core network that comprises a Serving GPRS Support Node (SGSN) 44, and a Gateway GPRS Support Node (GGSN) 46.

SGSN 44 is typically responsible for the delivery of data packets from and to BSs 42 within the geographical service area of the SGSN. Among other tasks, SGSN 44 performs packet routing and transfer, mobility management, as well as authentication and charging functions. SGSN 44 stores location information (e.g., current serving cell and roaming information) of the GPRS users that are registered with the SGSN.

GGSN 46 is responsible for the interconnection between CN 28 and external packet switched networks, such as Internet network 36. When receiving packet data destined to a given UE 32, GGSN 46 forwards the data to the SGSN that is serving the given UE. In the opposite direction, GGSN 46 routes mobile-originated packets to a respective destination in the network. GGSN 46 converts the GPRS packets coming from SGSN 44 into the appropriate packet data protocol (PDP) format (e.g., IP or X.25) and sends the packet data out on the corresponding packet data network.

Communication system 20 further comprises a Domain Name System (DNS) 48, which translates domain names into respective IP addresses. When initiating a communication session with a host, UE 32 typically first sends the domain name of the host to DNS 48, which responds by sending the corresponding IP address of the host back to the UE. The UE then uses the IP address to set up a secured communication session with the host.

A traffic manager 50 interconnects between RNC 40 and SGSN 44. The traffic manager intercepts DNS (and other) messages exchanged across the network. As will be described in detail below, the traffic manager uses DNS caching techniques to identify the type of service delivered within each communication session, and applies a respective traffic policy to the communication session depending on the identified service type. In some embodiments the traffic policy may depend on the identified service type in combination with additional criteria.

The network configuration system 20 in FIG. 1 is an example configuration, which is chosen purely for the sake of conceptual clarity. In alternative embodiments, any other suitable configuration can also be used. For example, the network configuration in FIG. 1 comprises single RNC and SGSN units. In practical UMTS networks, however, the functionalities of the RNC and GGSN units may be distributed over multiple such units. Thus, the GGSN may communicate with multiple SGSNs, and each SGSN may communicate with multiple RNCs.

Although the description that follows mainly refers to UMTS networks, such as the network depicted in FIG. 1 above, the disclosed techniques are also applicable to other suitable communication networks, with necessary adaptations. For example, when communication system 20 comprises a 3GPP LTE network, the functionality of GGSN 46 may move to a System Architecture Evolution (SAE) gateway, and the functionality of SGSN 44 may be implemented in a Mobility Management Entity (MME), both the SAE and MME are not shown in FIG. 1. As another example, system 20 may comprise a fully terrestrial communication network, and terminal 32 may comprise a Personal Computer (PC) or a laptop computer.

Identifying Service Type Using DNS Caching

UE 32 may execute one or more programs or applications to consume various services over the network, each service is associated with a respective service type (or multiple types). Network services include, for example, web browsing, file download (e.g., for application update), network games, electronic mail (e-mail), internet faxing, and consuming multimedia content such as, image, video or audio content.

The description that follows refers mainly to services that are provided to UE 32 over a secured connection. When the communication between the UE and the host that provides the service is secured, any information in the session traffic that may be indicative of the service type typically remains unavailable to network elements other than the UE and the serving host. As will be described in detail below, traffic manager 50 intercepts and analyzes certain traffic messages that the UE and service host exchange during establishing the connection, and other session messages, to deduce the service type of a service that is provided over the secured connection.

Figure 2:
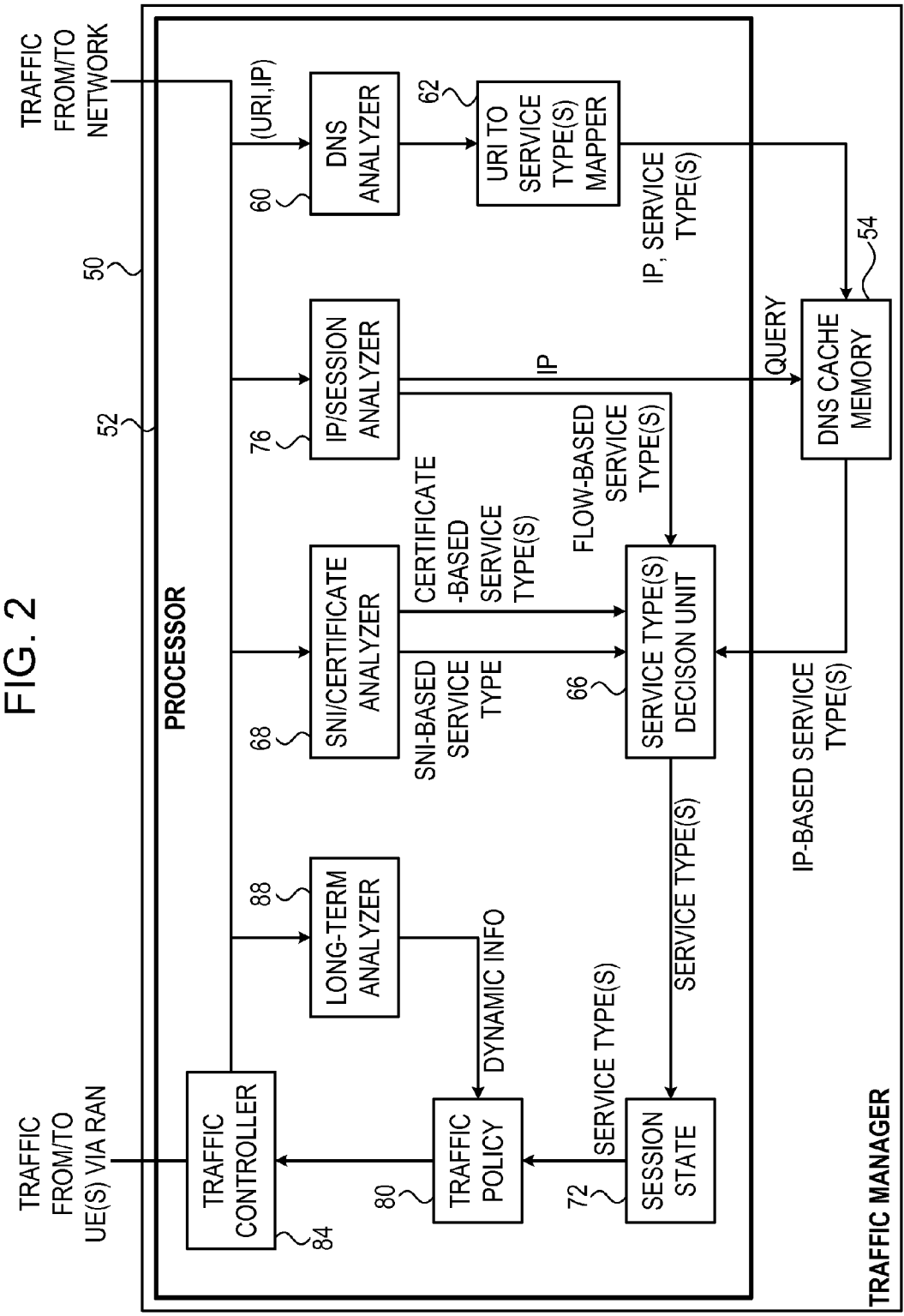
FIG. 2 is a block diagram that schematically illustrates a traffic manager, in accordance with an embodiment of the present invention.

FIG. 2 is a block diagram that schematically illustrates a traffic manager 50, in accordance with an embodiment of the present invention. Traffic manager 50 can be used, for example, in communication system 20 described in FIG. 1 above, or in any other suitable communication network. Traffic manager 50 comprises a processor 52, which executes the various tasks of the traffic manager, and a DNS cache memory 54 that caches DNS information and respective identified service types as will be described below.

Cache memory 54 may comprise any suitable type of volatile or non-volatile memory, such as, for example, Random Access Memory (RAM) or Flash memory. Alternatively, cache memory 54 may comprise a magnetic storage device such as a Hard Disk Drive (HDD), or any other suitable storage medium.

Processor 52 comprises a DNS analyzer 60 that intercepts DNS massages exchanged between UEs 32 and DNS 48. Typically, a DNS message that originates by UE 32 includes the URI identifying the serving host, and the DNS response message originated by DNS 48 includes the both the URI and respective IP address of the host.

In some embodiments, DNS analyzer 60 intercepts only the DNS response message and extracts both the URI and respective IP address from the DNS response message. A URI to service type(s) mapper 62 (or simply mapper 62 for brevity) maps the URI to one or more predefined service types, and caches the IP address of the host and respective service types in DNS cache 54 (if not already cached). The cached service type(s) are also referred herein as IP-based service types.

In some embodiments, DNS cache 54 comprises a local cache area and a global cache area. In the local cache area DNS cache 54 stores IP addresses and respective IP-based service types separately per UE. In the global cache area, DNS cache 54 stores IP addresses and respective IP-based service types globally per geographical area (e.g., for all the UEs served by a given BS).

When querying DNS cache 54 with a given IP address, cache 54 outputs the respective service types and delivers the service types to a service type(s) decision unit 66 (also referred to herein as decision unit 66 for brevity), which receives service types from several sources and outputs an updated service type (or types) as will be described below. Querying a certain IP address in DNS cache 54 is typically done in the local area for a given UE, and if the IP address is not cached locally for the given UE, the DNS cache searches the IP address in the global cache area. By caching the IP address of the serving host and the respective service type(s) it is possible for the processor to retrieve the IP-based service type(s) given only the IP address of the host.

When mapper 62 accepts a URI from DNS analyzer 60, mapper 62 maps the URI into one or more predefined service types. Typically, mapper 62 attempts to convert the URI into a unique service type, if possible. Mapper 62 can use any suitable method for converting URIs to service type(s). For example, mapper 62 can identify certain text strings within the URI and map these strings to service types based on a predefined mapping scheme.

When the information embedded in the URI regarding the service type, is ambiguous, mapper 62 can map the URI into a set of two or more service types, or to a single service type that captures multiple services. For example, mapper 62 can map a given URI to one of the service types: video delivery, multimedia delivery, a service type list that includes video and audio delivery, or to some general real-time delivery service type.

In some embodiments, when establishing a secured session, UE 32 and the serving host perform a handshake process in which UE 32 requests a certificate from the host. AS will be described below, Processor 52 comprises an SNI/certificate analyzer 68 that intercepts and analyzes session establishment messages for the purpose of service type identification.

In some embodiments, a single serving host may host multiple DNS hostnames on the same IP address, each corresponding to a different service. In such embodiments, the UE may send to the serving host a request that includes a Server Name Indication (SNI), which identifies a selected hostname among the multiple hostnames on the serving host. A given SNI typically corresponds to a single service type. SNI is defined, for example, in IETF specifications RFC 3546, entitled "Transport Layer Security (TLS) Extensions," published June 2003, which is incorporated herein by reference.

When receiving a UE request that includes a SNI, the serving host typically responds by presenting to the UE a certificate that includes the hostname that is associated with the SNI. In contrast to SNIs, a certificate may correspond to a single service type or to multiple service types, e.g., when the serving host includes a single hostname or multiple hostnames, respectively.

As described above, processor 52 comprises an SNI/certificate analyzer 68 that intercepts messages related to the establishment phase of secured sessions. When SNI/certificate analyzer 68 intercepts a UE request message that includes a SNI, analyzer 68 maps the SNI to a respective predefined service type and sends this SNI-based service type to decision unit 66.

When analyzer 68 further intercepts the serving host response, including the respective certificate, analyzer 68 maps service type related information embedded in the certificate into respective one or more predefined service type(s) and sends these certificate-based service types to decision unit 66.

Processor 52 comprises a session state 72, which manages state information for active sessions that are intercepted by traffic manager 50. Processor 52 can identify individual sessions in session state 72 using any suitable method, such as, for example, by assigning to each session a respective session identifier. Session state 72 stores the service types output from decision unit 66 in association with the respective communication session.

In some cases, the DNS response messages of DNS 48 are unavailable. For example, the UE may cache the IP address of the host internally and therefore does not request the IP address from DNS 48. As another example, the DNS phase may have occurred when the UE was served by another BS and therefore the DNS analyzer could not intercept the DNS messages. Processor 52 comprises an IP/session analyzer 76 that intercepts host IP addresses related to the active sessions stored in session state 72. The processor uses the intercepted IP address to query the global area of DNS cache 54 to retrieve the respective IP-based service types.

When an intercepted message belongs to an active session for which the service type is yet unknown, IP/session analyzer 76 extracts the IP address of the host from the intercepted message, and queries the IP address in DNS cache 54. If the IP address is found in the local area cache or in the global area cache, DNS cache 54 delivers the respective IP-based service type(s) to decision unit 66 that outputs updated one or more service types as described above. Processor 52 then stores the updated service type(s) in session state 72.

When the IP-based services are not available in the DNS cache, the processor may use a default service type, or attempt to derive one or more service types, for example, from information embedded in session establishment messages, or from flow characteristics, as will be described in detail below.

In some embodiments, IP/session analyzer 76 infers information regarding the service type of a given session by monitoring certain flow characteristics of the session. For example, in one embodiment IP/session analyzer 76 monitors the data volume delivered since session initiation, and distinguishes between a download or browsing service based on the data volume. For example, when the data volume exceeds a predefined volume (e.g., in bytes), the processor may infer that the service type relates to a download service and not to web browsing. Other flow characteristics that may indicate the service type include packet size, packet pace, and interval jitter between packets. For example, a voice stream typically comprises short packets at some constant rate, whereas video stream typically comprises longer packets at a constant rate.

Processor 52 further comprises a traffic policy 80 and a traffic controller 84. Traffic policy 80 holds multiple traffic control rules that traffic controller 84 may apply to individual communication sessions. Actions that traffic controller 84 can take include, for example, traffic throttling, postponing traffic delivery to a later time, and traffic blocking. Alternatively or additionally, traffic controller 84 can be used for traffic monitoring as well as for traffic reporting. Traffic controller 84 may apply the traffic policy separately per UE or per geographical area such as per BSs 42.

Traffic policy 80 selects predefined traffic control rules to apply to a given session based on the respective service types that are stored in the respective state in session state 72. For example, a traffic rule for sessions that deliver video content (or other services that are real-time in nature) may assign to such sessions higher priority over sessions providing other services. As another example, a traffic rule for a session that provides a file download service application update, may state that the traffic for this session should be throttled or postponed to a later time.

Traffic policy 80 may additionally select which traffic rule to apply based on dynamic network information, provided by a long-term analyzer 88 of processor 52. For example, long-term analyzer 88 may monitor the traffic load in BSs 42 to detect congestion, and apply a selected traffic rule only to sessions that are delivered via BSs that become congested.

In some embodiments, in which DNS caching is done separately per UE, per geographical area or both, traffic policy 80 may control only the traffic of selected UEs or geographical areas, respectively.

The configuration of traffic manager 50 in FIG. 2 is an example configuration, which is chosen purely for the sake of conceptual clarity. In alternative embodiments, any other suitable configuration can also be used. The different elements of processor 52 may be implemented using any suitable hardware, such as in an Application-Specific Integrated Circuit (ASIC) or Field-Programmable Gate Array (FPGA). In some embodiments, some elements of processor 52 can be implemented using software, or using a combination of hardware and software elements.

In some embodiments, processor 52 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 3:
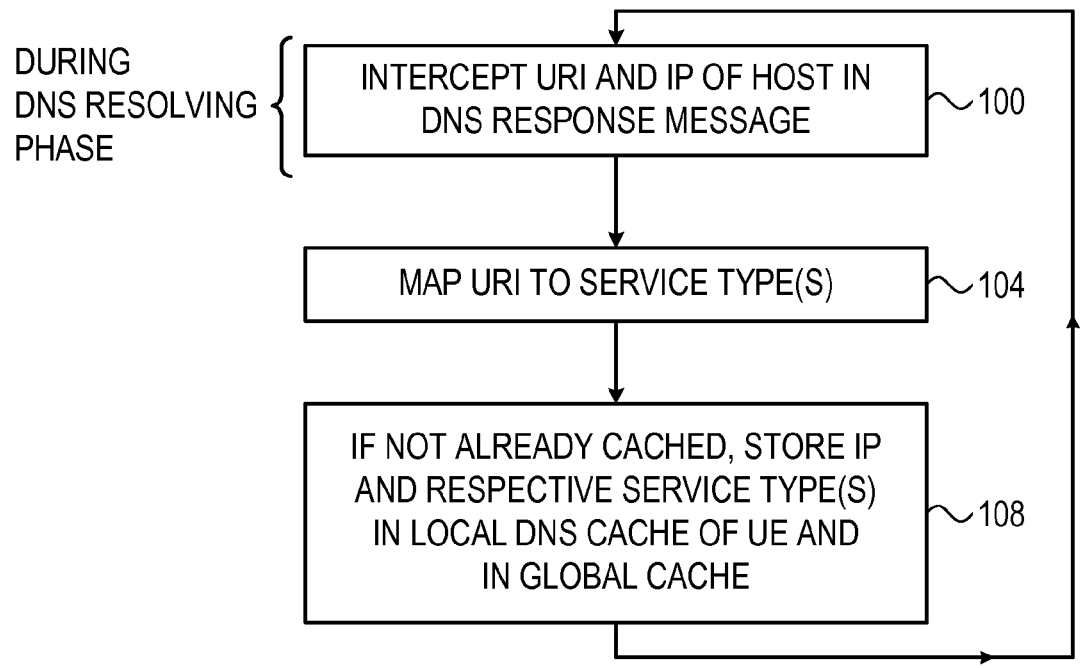
FIG. 3 is a flow chart that schematically illustrates a method for caching DNS information and respective service type(s), in accordance with an embodiment of the present invention.

FIG. 3 is a flow chart that schematically illustrates a method for caching DNS information and respective service type(s), in accordance with an embodiment of the present invention. The method begins at a DNS interception step 100, in which DNS analyzer 60 intercepts a DNS response message that DNS 48 sends to a given UE in response to receiving a DNS request message. The DNS response message includes the requested URI (or URL) and the DNS resolved IP address of the host.

At a mapping step 104, URI to service type(s) mapper 62 maps the URI intercepted at step 100 to one or more predefined service type(s) as described above. At a caching step 108, DNS cache 54 stores the IP address from step 100 in association with the service type(s) output at step 104.

DNS cache 54 stores the IP address and respective service type(s) for the given UE in the local cache area, as well as in the global cache area. The method then loops back to step 100 to intercept subsequent DNS response messages destined to the given UE or to other UEs.

Figure 4:
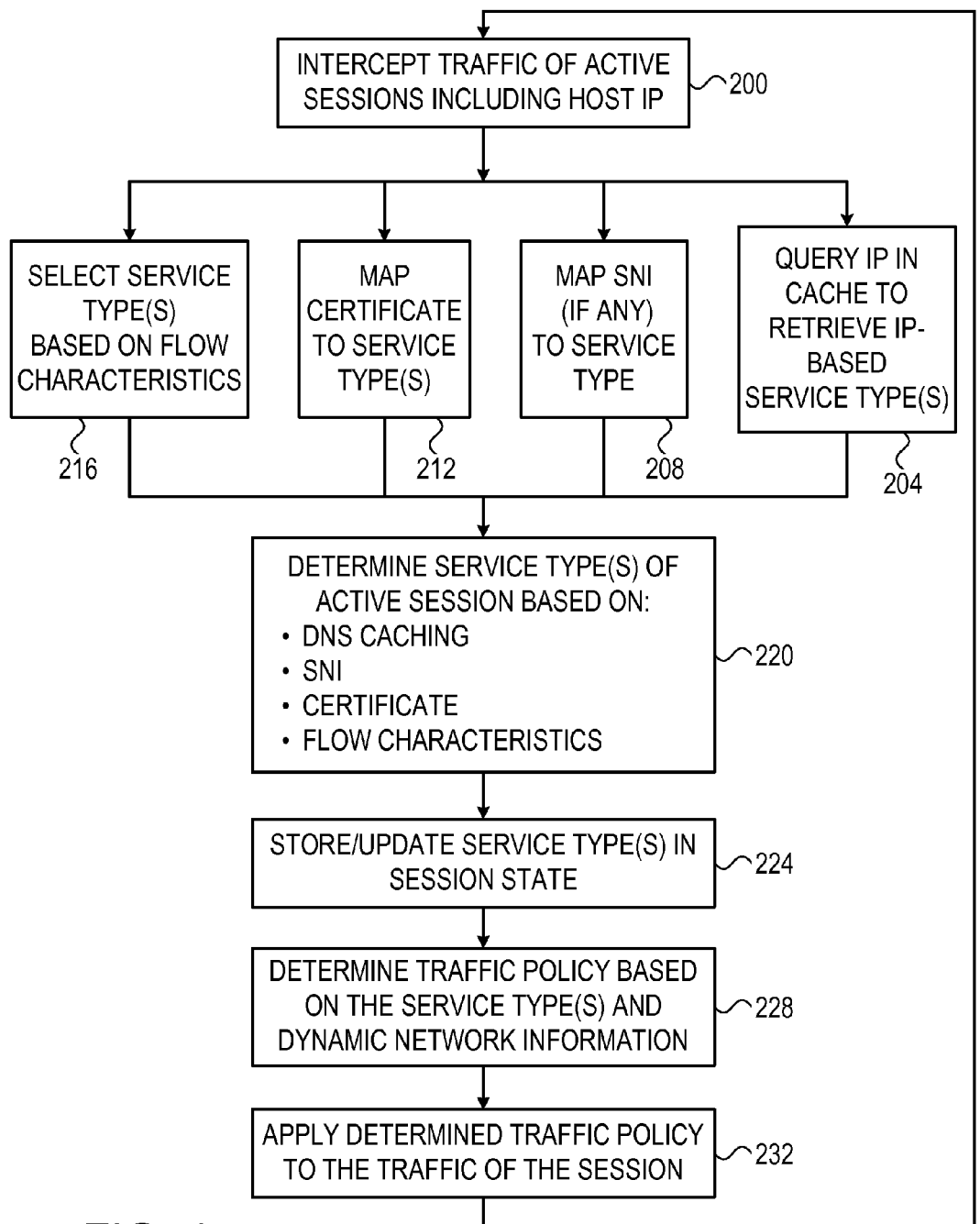
FIG. 4 is a flow chart that schematically illustrates a method for identifying session service type(s) and controlling session traffic based on the service type(s), in accordance with an embodiment of the present invention.

FIG. 4 is a flow chart that schematically illustrates a method for identifying session service type(s) and controlling session traffic based on the service type(s), in accordance with an embodiment of the present invention. The method is typically executed for active sessions whose service type(s) are stored in their state in session state 72.

The method begins at a session interception step 200, in which one of IP/session analyzer 76 and SNI/certificate analyzer 68 intercepts a message that belongs to given active session. Depending on the message intercepted at step 200, the processor executes one of the steps 204, 208, 212 or 216, which are described below, to derive one or more service types related to the given session.

At a query step 204, IP/session analyzer 76 uses a host IP address intercepted at step 200 to query cache 54 as described above. In response to the query operation, the DNS cache retrieves the respective IP-based service types from the DNS cache as described above, and delivers the IP-based service types to decision unit 66.

At a SNI mapping step 208, SNI/certificate analyzer 68 maps a SNI in an intercepted UE request for session establishment to a respective SNI-based service type, and delivers the SNI-based service type to decision unit 66.

At a certificate mapping step 212, SNI/certificate analyzer 68 maps a certificate that was intercepted at step 200 in a host response message, into one or more predefined certificate-based service types, to be delivered to decision unit 66.

At a flow characteristics estimation step 216, IP/session analyzer 76 estimates flow characteristics of the session messages, and maps the flow characteristics to one or more predefined flow-based service types. Several examples for flow characteristics and related service types were given above.

At a decision step 220, decision unit 66 accepts service type(s) derived in one of the steps 204, 208, 212 and 216 above, i.e., IP-based, SNI-based, certificate-based and flow-based service types, and produces one or more updated service types. At a state update step 224, processor 52 stores the service type(s) derived at step 220 in session state 72.

At a policy determination step 228, traffic policy 80 selects one or more traffic rules based on the updated service type(s) in session state 72 and on dynamic network information provided by long-term analyzer 88, such as, for example congestion conditions in the network.

In another embodiment, the traffic rule may relate to the quality of service that the user experiences. For example, comparing video delivery to application update, the user typically experiences higher degradation in the quality of service when the network fails to deliver video content in real-time, than when the network delays the download process during application update. Therefore, a traffic rule may assign higher priority to video delivery than to application update.

At a policy application step 232, traffic controller 84 applies the traffic rules selected at step 228 to the traffic of the given session. Typically traffic controller 84 applies the traffic policy on a packet-by-packet base. The method then loops back to step 200 to intercept subsequent session traffic messages.

The methods described above are exemplary methods, and other methods can be used in alternative embodiments. Although the disclosed techniques refer mainly to secured communication sessions, the techniques are also applicable to unsecured communication sessions, e.g., by excluding embodiments that infer the service type from messages that are related to the establishment of a secured session.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
intercepting Domain Name System (DNS) messages that are sent in a communication network in preparation for setting up respective communication sessions that provide respective services associated with respective service types;
extracting from the intercepted DNS messages DNS information that is indicative of the respective service types, including extracting Uniform Resource Identifiers (URIs) identifying hosts in the communication network to which users attempt to connect, and respective IP addresses of the hosts, and mapping the extracted URIs to one or more predefined service types;
caching the extracted DNS information, including caching the extracted IP addresses and the one or more service types in association with one another;
identifying a service type associated with a given communication session using the cached DNS information, by intercepting in traffic of the given communication session a host IP address of a host associated with the given communication session, retrieving a cached host URI that is associated with the host IP address, and mapping the host URI to respective one or more predefined service types; and
applying a traffic policy to the given communication session depending on the identified service type.

2. The method according to claim 1, wherein the given communication session delivers a respective service over a secured connection.

3. The method according to claim 1, wherein identifying the service type comprises intercepting a session initiation request message that a user sends to a host to establish the given communication session, and if the initiation request message includes a Session Name Indication (SNI), mapping the SNI to a respective predefined service type.

4. The method according to claim 1, wherein identifying the service type comprises monitoring flow characteristics of the given communication session, and identifying the service type based on the flow characteristics.

5. The method according to claim 1, wherein applying the traffic policy comprises changing a rate of data delivery of traffic of the given communication session.

6. The method according to claim 1, wherein applying the traffic policy comprises applying the traffic policy based on congestion conditions that evolve in the communication network.

7. A method for communication, comprising:
intercepting Domain Name System (DNS) messages that are sent in a communication network in preparation for setting up respective communication sessions that provide respective services associated with respective service types;
extracting from the intercepted DNS messages DNS information that is indicative of the respective service types, including Uniform Resource Identifiers (URIs) identifying hosts in the communication network to which users attempt to connect, and respective IP addresses of the hosts, and mapping the extracted URIs to one or more predefined service types, and caching the extracted DNS information, including caching the extracted IP addresses and the one or more service types in association with one another; and
identifying a service type associated with a given communication session using the cached DNS information, and applying a traffic policy to the given communication session depending on the identified service type,
wherein the communication sessions are associated with respective users consuming the respective services, and with respective geographical areas over which the communication sessions are delivered, and wherein caching the DNS information comprises caching the IP address and identified service type locally per user and globally per geographical area, and wherein identifying the service type comprises retrieving the globally cached service type only if retrieving the locally cached service type fails.

8. The method according to claim 7, wherein applying the traffic policy comprises applying the traffic policy separately per user.

9. The method according to claim 7, wherein applying the traffic policy comprises applying the traffic policy separately per the geographical area.

10. A method for communication, comprising:
intercepting Domain Name System (DNS) messages that are sent in a communication network in preparation for setting up respective communication sessions that provide respective services associated with respective service types;
extracting from the intercepted DNS messages DNS information that is indicative of the respective service types, and caching the extracted DNS information; and
identifying a service type associated with a given communication session using the cached DNS information, and applying a traffic policy to the given communication session depending on the identified service type,
wherein identifying the service type comprises intercepting a certificate that a host sends to a user in setting up the given communication session, and mapping service-type related information embedded in the certificate to one or more predefined service types.

11. An apparatus, comprising:
a cache memory; and
a processor, which is configured to:
intercept Domain Name System (DNS) messages that are sent in a communication network in preparation for setting up respective communication sessions that provide respective services associated with respective service types,
extract from the intercepted DNS messages DNS information that is indicative of the respective service types, including extracting Uniform Resource Identifiers (URIs) identifying hosts in the communication network to which users attempt to connect;
extract respective IP addresses of the hosts;
map the extracted URIs to one or more predefined service types;
cache the extracted DNS information, including caching the extracted IP addresses and the one or more service types in association with one another;
identify a service type associated with a given communication session by intercepting in traffic of the given communication session a host IP address of a host associated with the given communication session, retrieving a cached host URI that is associated with the host IP address, and mapping the host URI and host IP address to respective one or more predefined service types; and
apply a traffic policy to the given communication session depending on the identified service type.

12. The apparatus according to claim 11, wherein the given communication session delivers a respective service over a secured connection.

13. The apparatus according to claim 11, wherein the processor is configured to identify the service type by intercepting a session initiation request message that a user sends to a host to establish the given communication session, and, if the initiation request message includes a Session Name Indication (SNI), to map the SNI to a respective predefined service type.

14. The apparatus according to claim 11, wherein the processor is configured to identify the service type by monitoring flow characteristics of the given communication session, and to identify the service type based on the flow characteristics.

15. The apparatus according to claim 11, wherein the processor is configured to apply the traffic policy by changing a rate of data delivery of traffic of the given communication session.

16. The apparatus according to claim 11, wherein the processor is configured to apply the traffic policy based on congestion conditions that evolve in the communication network.

17. An apparatus, comprising:
a cache memory; and
a processor, which is configured to:
intercept Domain Name System (DNS) messages that are sent in a communication network in preparation for setting up respective communication sessions that provide respective services associated with respective service types;
extract from the intercepted DNS messages DNS information that is indicative of the respective service types;
cache the extracted DNS information;
identify a service type associated with a given communication session using the cached DNS information; and
apply a traffic policy to the given communication session depending on the identified service type,
wherein the communication sessions are associated with respective users consuming the respective services, and wherein the processor is further configured to cache the DNS information separately per user, and to apply the traffic policy separately per user.

18. An apparatus, comprising:
a cache memory; and
a processor, which is configured to:
- intercept Domain Name System (DNS) messages that are sent in a communication network in preparation for setting up respective communication sessions that provide respective services associated with respective service types;
- extract from the intercepted DNS messages DNS information that is indicative of the respective service types;
- cache the extracted DNS information;
- identify a service type associated with a given communication session using the cached DNS information; and
- apply a traffic policy to the given communication session depending on the identified service type,
- wherein the communication sessions are associated with respective geographical areas over which the communication sessions are delivered, and wherein the processor is further configured to cache the DNS information separately per geographical area, and to apply the traffic policy separately per the geographical area.

19. An apparatus, comprising:
a cache memory; and
a processor, which is configured to:
- intercept Domain Name System (DNS) messages that are sent in a communication network in preparation for setting up respective communication sessions that provide respective services associated with respective service types;
- extract from the intercepted DNS messages DNS information that is indicative of the respective service types;
- cache the extracted DNS information;
- identify a service type associated with a given communication session using the cached DNS information by intercepting a certificate that a host sends to a user in setting up the given communication session, to map service-type related information embedded in the certificate to one or more predefined service types; and
- apply a traffic policy to the given communication session depending on the identified service type.

* * * * *